United States Patent [19]

Levine

[11] 4,184,384
[45] Jan. 22, 1980

[54] PISTON CRANKSHAFT CONNECTING ROD

[76] Inventor: Melvin Levine, 330 E. 79th St., New York, N.Y. 10021

[21] Appl. No.: 896,137

[22] Filed: Apr. 13, 1978

[51] Int. Cl.² ............................................. G05G 1/00
[52] U.S. Cl. .................. 74/579 E; 74/579 R; 74/594; 308/67
[58] Field of Search ................. 74/579 R, 579 E, 594, 74/589; 308/67

[56] References Cited

U.S. PATENT DOCUMENTS

| 153,667 | 8/1874 | Crane | 74/594 |
| 368,519 | 8/1887 | Cumnock | 74/579 |
| 369,883 | 9/1887 | Richards | 74/594 |
| 383,879 | 6/1888 | Greening | 74/594 X |
| 465,454 | 12/1891 | Bunker | 74/594 |
| 638,595 | 12/1899 | Raby et al. | 74/594 X |
| 885,878 | 4/1908 | Skirrow | 74/579 X |
| 1,179,171 | 4/1916 | Fish et al. | 74/594 |
| 1,612,047 | 12/1926 | Owens | 74/579 E X |
| 2,359,669 | 10/1944 | Oliver | 74/594 X |
| 2,738,687 | 3/1956 | Meile | 74/579 E |

FOREIGN PATENT DOCUMENTS 344047 10/1936 Italy .......................................... 74/579
7980 of 1894 United Kingdom ................... 74/579 E Primary Examiner—Samuel Scott
Assistant Examiner—Daniel J. O'Connor
Attorney, Agent, or Firm—Howard C. Miskin

[57] ABSTRACT

A piston crankshaft connecting rod includes a column having a piston wrist pin engaging bearing collar at one end and a crankpin engaging split bearing collar at the opposite end, the split collar being releaseably locked in assembled condition by a flexible metal band encircling the outer section of the split collar and either the split collar inner section or the full column including the wrist pin collar or another portion of the connecting rod. The band is longitudinally medially slotted at opposite ends and the separate arms are looped, the loops engaging pins on tapped and smooth bored coupling members engaged by a bolt so that contraction and separation between the band ends may be effected by turning the bolt. The inner split collar is integrallly formed with the column or is cradled in a saddle formed at the column end.

7 Claims, 7 Drawing Figures

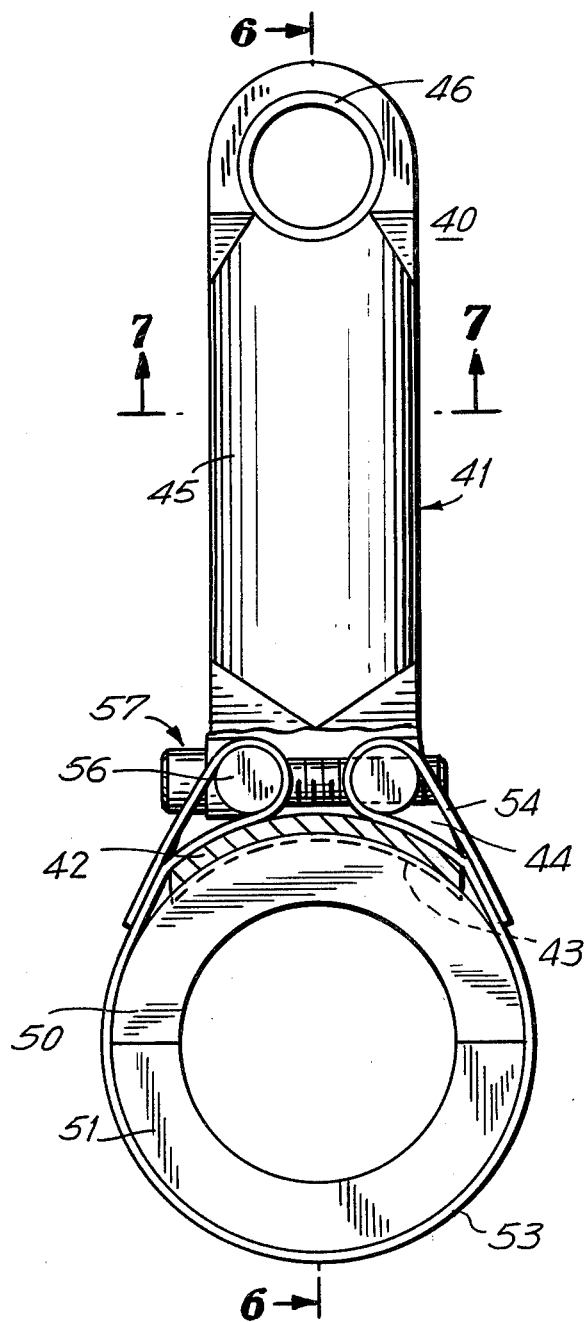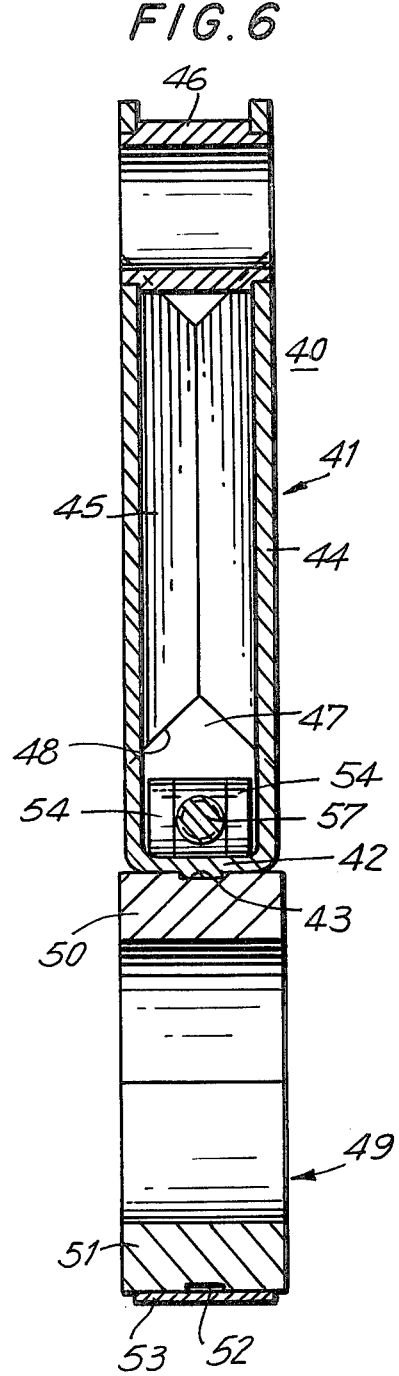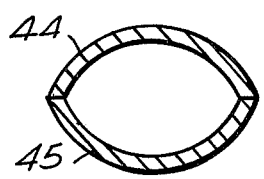

PISTON CRANKSHAFT CONNECTING ROD

BACKGROUND OF THE INVENTION

The present invention relates generally to improvements in internal combustion engines and it relates more particularly to an improved connecting rod between the engine piston and crank shaft.

In the conventional multipiston type internal combustion engine the pistons are coupled to a crank shaft by connecting rods to translate the reciprocating motion of the pistons to the rotary motion of the crank shaft. This mechanism contributes greatly to a drop in engine efficiency and to frequently excessive vibration particularly in high speed engines and a good part of this is due to the weight of the connecting rod. The connecting rod is subjected to great variations in stress, rapid periodic changes between compression and tension, torsion and high periodic shock, and must not only be constructed to withstand such changing and high stresses which frequently lead to fatigue failures but must be properly balanced both statistically and dynamically.

The conventional internal combustion engine connecting rod consists of a main column provided at one end with a bearing collar for engaging the piston pin and at the other end with a split bearing collar for engaging a crank shaft eccentric pin. The section of the split collar is formed at the end of the column and the other section of the split collar is separably bolted to the first section by a pair of side bolts engaging aligned smooth and tapped bores in enlarged side portions of the collar. The high stresses imparted to the connecting rod are transmitted to these enlarged sections as well as to the connecting bolts necessitating the use of heavy bolts and greatly enlarged side sections thereby contributing to the great weight of the connecting rod which is commonly made of forged or cast steel. Producing the connecting rods of aluminum or other light weight metal does not appreciably alleviate the weight problems since a greater volume of metal is required particularly at the split ring coupling areas and leads to other disadvantages.

It is a principal object of the present invention to provide an improved reciprocating piston type engine.

Another object of the present invention is to provide an improved reciprocating piston type of internal combustion engine particularly of the multicylinder high speed type.

Still another object of the present invention is to provide an improved piston crankshaft coupling connecting rod.

A further object of the present invention is to provide an improved connecting rod which is of high strength and high shock and fatigue resistance and of low weight whereby to minimize engine vibration even at high speeds.

Still a further object of the present invention is to provide a connecting rod of the above nature characterized by its low cost, ease of fabrication, long effective life and high versatility and adaptability with a resulting improvement in the efficiency and performance of the engine.

The above and other objects of the present invention will become apparent from a reading of the following description taken in conjunction with the accompanying drawings which illustrate preferred embodiments thereof.

In a sense, the present invention contemplates the provision of an improved connecting rod for coupling an engine reciprocating piston to a crank shaft, the connecting rod comprising a column, a first bearing collar located at one end of the column engaging a piston pin, a split second bearing collar at the opposite end for engaging an eccentric pin on a crank shaft and including opposite inner and outer sections, said outer section being separable from said inner section and an elongated flexible securing member engaging the outer periphery of the collar outer section and a surface of at least another portion of the connecting rod to firmly secure the split collar outer section to the split collar inner section. Advantageously, the securing member comprises a high strength flexible metal band, the ends of which are longitudinally adjustably joined to permit the tightening or loosening of the securement of the split collar outer section and in its preferred form the ends of the metal band are provided with loops which engage coupling pins carried by respectively internally threaded and smooth bored blocks which engage a bolt so that turning the bolt in one direction draws the band ends together and in the other direction separates them.

In accordance with one preferred embodiment of the present invention, the split bearing collar inner section is integrally formed at the end of the column and the securing band encircles and tightly engages the peripheral surface of the first and second collar sections, the ends of the bands being longitudinally slotted and looped to engage the respective coupling pins and to clear the column. In a modified form the sides of the column are tangent to and extend from the sides of the split collar inner section and the band encircles the split collar outer section, the column and the opposite bearing collar and the band end coupling member registers with a recess formed in the column. According to a further embodiment the lower end of the column is provided with transverse passageway and terminates in an arcuate saddle which engages the split collar inner section. The split collar sections and column are releasably locked in assembled condition by a flexible band which extends about the periphery of the split collar lower section, the cradle and the upper section and the ends of the band are connected by the adjustable coupling member which registers with the passageway.

The use of the flexible securing member or band for retaining the split bearing collar in a locked assembled condition overcomes the drawbacks and disadvantages of the conventional connecting rod structures. The flexible band is lightweight, strong and adaptable, and not only reliably locks the split collar in an optimum closed condition but contributes to the overall strength and shock and fatigue resistance of the connecting rod as well as that of the bearing collars. The mass of the connecting rod structure is greatly reduced, thereby contributing to increased engine efficiency and improved low vibration performance even at high speeds. Furthermore, the present improved structure permits the use of a wide range of desirable materials, in addition to forged or cast steel, stamped metal may be employed as well as the light weight metals such as aluminum, magnesium, titanium and alloys therefor as well as the high temperature synthetic polymeric compositions which may be fiber reinforced by compositions of carbon fibers and other high strength fibers.

BRIEF DESCRIPTION OF THE DRAWINGS

FIG. 5 is a front elevational view of a further embodiment of the present invention;

FIG. 6 is a sectional view taken along line 6—6 in FIG. 5; and

FIG. 7 is a sectional view taken along line 7—7 in FIG. 5.

DESCRIPTION OF THE PREFERRED EMBODIMENTS

Figure 1:
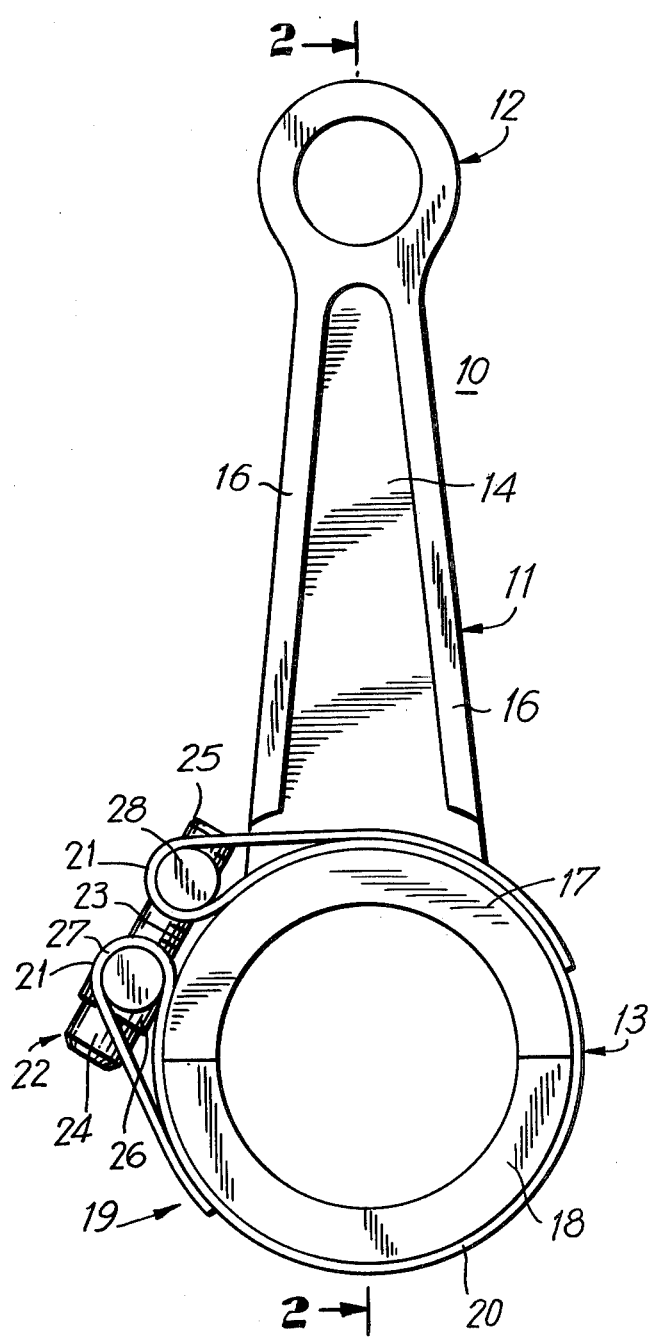
FIG. 1 is a front elevational view of an assembled connecting rod embodying the present invention.
Figure 2:
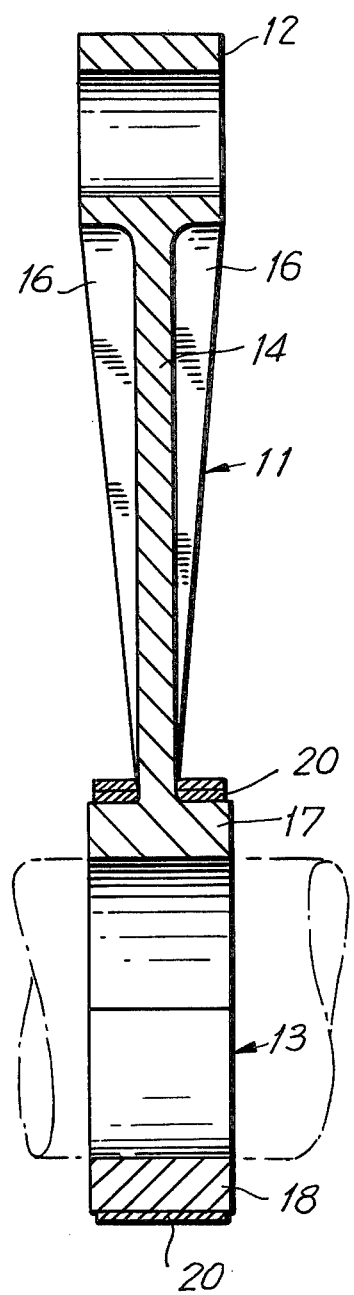
FIG. 2 is a sectional view taken along line 2—2 in FIG. 1.

Referring now to the drawings, particularly FIGS. 1 and 2 thereof which illustrates a preferred embodiment of the present invention, the reference numeral 10 generally designates the improved connecting rod which includes a column defining elongated portion 11 having at one end a bearing collar 12 for engaging a piston wrist pin and at the other end a transversely diametrically split bearing collar 13 for engaging a crank pin of the engine crank shaft. The column 11 and the collars 12 and 13 are formed of any suitable material such as steel, a light metal such as aluminum, magnesium or the like and alloys thereof, reinforced temperature resistant polymeric resins, carbon or other high strength fiber compositions or the like, and the collars are lined or provided with suitable bearing compositions in the known manner.

The column 11 is constructed to withstand the stresses experienced by connecting rods and includes a cross web 14 having side edges diverging from collar 12 to collar 13 and provided along its longitudinal edges with oppositely projecting reinforcing flanges 16 which are wide at their tops and converge with the web 14 at opposite points above the bottom of the column 11.

The bearing collar 12 is integrally formed with flange 16 located at the top of column 11 and is coextensive with the tops of flanges 16 and joined thereto and the web 14.

The bearing collar 13 is usually of greater diameter than the bearing collar 12 and includes inner and outer 180° split sections 17 and 18 respectively which have abutting confronting end faces which may be of interlocking complimentary configuration. The inner collar section 17 is integrally formed with and symmetrical to the cross web 14 and the outer collar section 18 is releaseably locked to the inner collar section 17 by a fastening assembly 19.

The fastening assembly 19 includes an elongated high strength flexible band 20 formed of steel or other suitable material, the band being longitudinally medially slotted at opposite end portions to form end pairs of laterally spaced arms, the ends of which are folded backwardly along and welded or otherwise secured to the outer faces of the band 20 to form end pairs of laterally spaced anchoring loops 21. The band 20 encircles or extends about the peripheral face of the collar 13 the slot between the loops 21 of one pair engaging the bottom of and permitting the clearance of cross web 14. The opposite pairs of loops 21 are interconnected by an adjustable connector or coupling member 22 which permits the tightening and loosening of the band 20 and hence the locking and releasing of the split collar sections 17 and 18.

The connector member 22 includes a bolt 23 having a threaded shank 25 and an enlarged head 24 for the reception of a suitable tool. A block 26 has a smooth bore rotatably engaging the bolt shank 25 and abuts the head 24 and is provided with diametrically opposed laterally projecting pins 27 which engage a pair of transversely spaced loops 21. The elongated pin 28 has a tapped diametric bore engaging the threaded shank 25 and engages the opposite pair of laterally spaced loops 21. Thus, by turning bolt 23 in one direction, the band 20 is tightened to lock the split collar 13 and by turning the bolt 23 in the opposite direction the band 20 is loosened to release the collar 13 and permit the separation of the outer collar section 18.

The application and operation of the improved connecting rod 10 is clear from the above.

Figure 3:
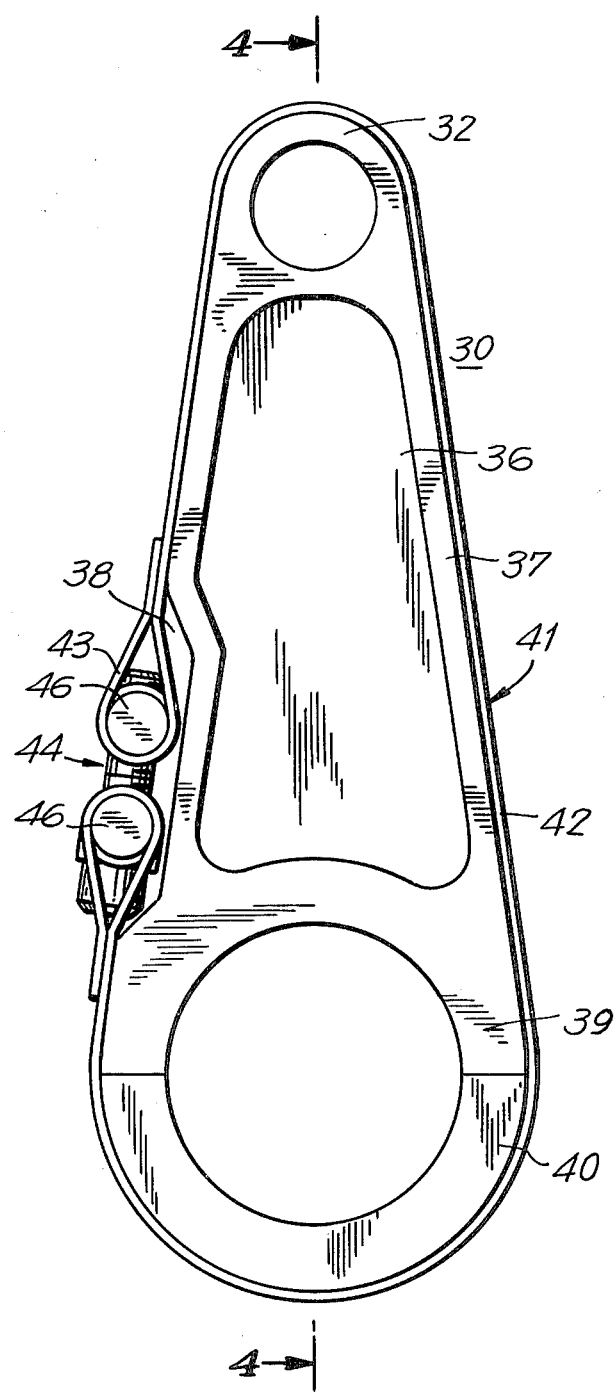
FIG. 3 is a front elevational view of another embodiment of the present invention.
Figure 4:
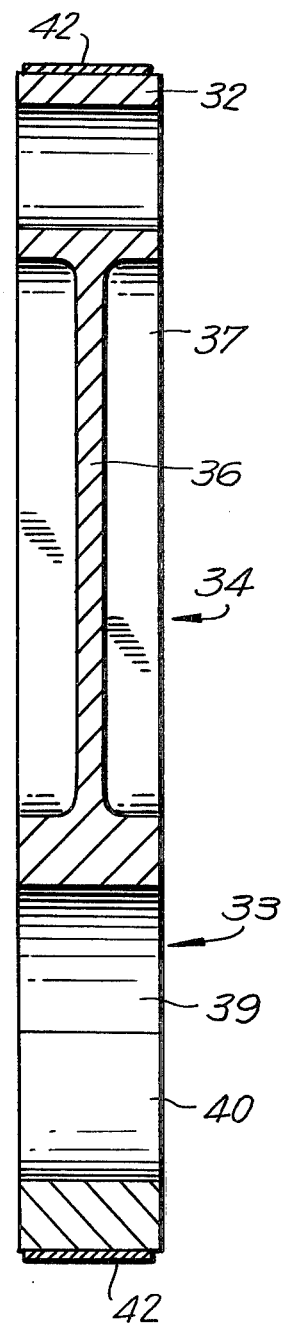
FIG. 4 is a sectional view taken along line 4—4 in FIG. 3.

The embodiment of the present invention illustrated in FIGS. 3 and 4 differs from that first described principally in that the band releaseably locking the split bearing collar in assembled condition functions as well to reinforce the overall connecting rod. Specifically, the modified connecting rod 30 includes a piston wrist pin engaging bearing collar 32, a crank pin engaging split bearing collar 33 and an interconnecting column 34 corresponding respectively to collars 12 and 13 and column 11.

The column 34 includes a cross web with side edges diverging from collar 32 to collar 33 and having a recess formed along one edge proximate to collar 33. A flange 37 extends along the web side edges between the collars 32 and 33 and is coextensive in width thereto and a pocket or recess 38 is disposed at the recessed portion of web 36 adjacent to the split collar 33. The split collar 33 includes an inner split section 39 integral with column 34 and an outer split section 40 releaseably locked to the inner split section 39 by a fastening assembly 41.

The fastening assembly 41 includes an elongated high strength flexible metal band 42 which extends about the periphery of split collar outer section 40 along the outer faces of flanges 37 and about the outer periphery of collar 32. The ends of band 32 are longitudinally medially slotted and formed into opposite pairs of laterally spaced loops 43 corresponding to loops 21. A longitudinally adjustable connector member 44 similar in structure and operation to connector member 22 has opposing coupling arms 46 engaging corresponding loops 43 so that the band 42 may be tightened or loosened to lock or release the split collar section 40 to or from the split collar section 39, the connecting rod being reinforced by the tightened band 42. The connector member 44 and loops 43 register with and partly nest in recess 38.

Referring now to FIGS. 5 to 7 which illustrate a further embodiment of the present invention in which the column member 41 of the connecting rod may be formed as a unit from metal sheet with consequent reduced weight, lesser cost and increased strength. The column member 41 includes an arcuate downwardly concave, saddle defining cross wall 42 having a longitudinal medial ridge 43 on its outer face and opposite parallel longitudinal side walls.

Formed in the upper parts of side walls 44 are a pair of transversely coaxial circular openings between which extend and which are engaged by a piston pin engaging collar 46 which is suitably anchored to the side walls 44. The side walls 44 between shortly below collar 46 and a level above cross wall 42 are of curved transverse cross section as at 45 with the longitudinal edges of the opposite walls 44 coinciding and being firmly joined to each other by brazing or the like to form a tubular column. A transverse passageway 47 is delineated by the upper face of cross wall 42 and the lower edges 48 of the curved section of side walls 44.

The crank pin engaging split collar 49 is formed of mating similar semi-cylindrical inner and outer sections 50 and 51 respectively with confronting abutting or interfitting end faces. A peripheral channel 52 is formed in the medial outer faces of collar sections 50 and 51 and the collar section 50 rests in the saddle 42 with the channel 52 therein medially engaged by the ridge 43.

The collar sections 50 and 51 are releaseably locked in assembled condition to form bearing collar 49 and are anchored to the column 41 by a band 53 extending about the outer faces of split collar sections 50 and 51 and the outer face of saddle 42. The band 53 terminates at its ends in opposite pairs of loops 54 which engage the coupling pins 56 of an adjustable connector member 57 registering with passageway 47. The band 53 and connector member 57 are similar in structure and operation to those of band 20 and connector member 22 described earlier.

While there have been described and illustrated preferred embodiments of the present invention it is apparent that numerous alterations, omissions and additions may be made without departing from the spirit thereof.

I claim:

1. A connecting rod comprising a longitudinally extending column member, a first bearing collar affixed to one end of said column member, a split second collar located at the opposite end of said column member and including a pair of separable, interfitting inner and outer split collar sections and a peripherally adjustable continuous elongated flexible anchoring member extending about and tightly encircling the outer faces of said inner and outer split collar sections to releaseably lock said inner and outer split collar sections in assembled condition.

2. The connecting rod of claim 1 wherein said anchoring member includes an elongated flexible metal member and means for coupling the ends of said metal member to form a loop.

3. The connecting rod of claim 2, wherein said coupling means is adjustable to vary the peripheral length of said loop.

4. The connecting rod of claim 3, wherein said elongated flexible metal member comprises a flexible metal band.

5. The connecting rod of claim 4 wherein said inner split collar section is integrally formed with said column member.

6. The connecting rod of claim 4 wherein said coupling means comprising a pair of longitudinally spaced coupling elements engaging opposite ends of said flexible band and screw means for selectively contracting and separating said coupling elements.

7. The connecting rod of claim 4 wherein said first bearing collar is integrally formed with said column member.

* * * * *